UNITED STATES PATENT OFFICE.

HENRY JOHN DUNN, OF LONDON, ENGLAND.

PROCESS OF MAKING MEAT POWDER.

SPECIFICATION forming part of Letters Patent No. 658,248, dated September 18, 1900.

Application filed March 27, 1899. Serial No. 710,691. (No specimens.)

*To all whom it may concern:*

Be it known that I, HENRY JOHN DUNN, glove-manufacturer, a citizen of England, residing at No. 15 Walpole road, Twickenham, London, in the county of Middlesex, England, have invented certain new and useful Improvements in the Manufacture of Food Powders and Extracts, (for which I have applied for a patent in Great Britain, dated February 13, 1899, No. 3,204,) of which the following is a specification.

My invention resides in a process for obtaining animal food products containing all the nutriment of the original material and which will be light, portable, and ready for cooking when required.

In treating meat or poultry according to my process I first remove most of the fat, then mince the material under treatment or otherwise reduce it to small fragments, and finally subject it to the drying action in an unreturning current of dry air, which may be sterilized. The air at first should be cold, not exceeding 60° Fahrenheit, to positively fix the material without alteration in nature at a point where decomposition or putrefaction shall not attack it and retain the natural raw flavor unaltered that nature endowed it with. Toward the end of the operation, however, the temperature of the air is raised to a point not exceeding 100° Fahrenheit to further dissipate the small remaining moisture and consummate the process. When the fragments are dry, containing about five per cent. of water, they are greatly reduced in weight by the elimination of moisture and may be retained in this form, or unless they are already very small they may be reduced to a fine powder, which may be further dried. The small fragments or powder compressed into blocks or cakes and packed in impervious material may be kept for long periods in fresh condition ready for cooking.

An unreturning current of dry air which does not exceed 60° Fahrenheit must be used in the first stage of the drying operation and must be followed by a current of dry air not exceeding a temperature of 100° Fahrenheit. Further, neither temperature used solely throughout or in reverse order will effect the required result. The preliminary degree is a *sine qua non* to the subsequent higher degree, without which the operation would be incomplete and entirely futile. Only by this sequence, carried out as above set forth, can meat be kept pure and its natural flavor be retained. The higher temperature used first would induce the very deterioration that it is the vital object of my invention to circumvent. After having fortified the material against that danger and reduced it to a practically-dry state by the current of dry air not exceeding 60° Fahrenheit the subsequent higher temperature, not exceeding 100° Fahrenheit, can be administered to dissipate the small remaining moisture and consummate the process.

I have by actual experiment proved that the temperatures named for the air are the maximum temperatures beyond which it is unsafe to venture. By varying them it is impossible to obtain the results reached by me, which are to hold unaltered and in its entirety what nature alone gave and secure the product in a form in which the original flavor is manifestly more palatable and with increased inducement to assimilation raw in the system of what nature furnishes as the highest nourishment that she vouchsafes to us. Any deviation from the sequence I adopt is fatal to the issue. There is no preferable or alternative method to be considered in the matter. Thus perfect purity, together with the natural flavor of fresh raw meat, is presented in the product obtained, which may be cooked, if desired, or used in a raw state for medicinal purposes when prescribed. Fish food may be similarly treated, except in this, that there is no preliminary removal of the fat.

Having now described my invention, what I claim as new, and desire to secure by Letters Patent, is—

1. The process for the production of meat powder retaining its natural raw flavor which consists in comminuting the animal food substance, and then subjecting the same to the drying action of a current of air at a temperature not exceeding 60° Fahrenheit followed by a current of air at a higher temperature not exceeding 100° Fahrenheit.

2. The process for the production of meat powder retaining its natural raw flavor which consists in removing the fat, comminuting the remaining animal food substance, subjecting the same to the desiccating action of a current of dry air at a temperature not exceeding 60° Fahrenheit followed by a current of air at a higher temperature not exceeding 100° Fahrenheit and finally compressing the dry comminuted substance into cakes or tablets.

In testimony whereof I have hereunto set my hand in presence of two subscribing witnesses.

HENRY JOHN DUNN.

Witnesses:
GERALD L. SMITH,
C. S. HOPKINS.